United States Patent [19]
Burgess et al.

[11] Patent Number: 5,590,369
[45] Date of Patent: Dec. 31, 1996

[54] BUS SUPPORTING A PLURALITY OF DATA TRANSFER SIZES AND PROTOCOLS

[75] Inventors: Dana J. Burgess, Estes Park; Robert E. Stubbs, Longmont, both of Colo.

[73] Assignee: Fujitsu Limited, Kawasaki, Japan

[21] Appl. No.: 511,048

[22] Filed: Aug. 3, 1995

Related U.S. Application Data

[63] Continuation of Ser. No. 275,119, Jul. 14, 1994, abandoned.

[51] Int. Cl.$^6$ .................................................. G06F 13/00
[52] U.S. Cl. .............. 395/800; 395/200.13; 395/200.19; 395/881; 395/285; 364/DIG. 1
[58] Field of Search ............................. 395/800, 200.13, 395/200.19, 881, 285; 364/DIG. 1

[56] References Cited

U.S. PATENT DOCUMENTS

| | | | |
|---|---|---|---|
| 4,807,109 | 2/1989 | Farrell et al. | 395/550 |
| 5,214,774 | 5/1993 | Welsch et al. | 455/11.1 |
| 5,247,616 | 9/1993 | Berggren et al. | 395/200.08 |
| 5,255,375 | 10/1993 | Crook et al. | 395/285 |
| 5,280,623 | 1/1994 | Sodos et al. | 395/285 |

*Primary Examiner*—Daniel H. Pan
*Assistant Examiner*—Dzung Nguyen
*Attorney, Agent, or Firm*—Sheridan Ross P.C.

[57] ABSTRACT

A bus for transferring data is disclosed wherein the bus supports asynchronous, synchronous and high speed synchronous data transfers of varying size. The bus includes a master component for controlling data transfers with one or more slave components attached to the bus. Each data transfer is either received or supplied by the master via a set of data lines common to each slave component. Further, there are different control lines between the master and the slave components depending on the protocol(s) supported by each of the slaves. In particular, a slave supporting a high speed synchronous protocol is connected to the master by four control lines dedicated to providing control signals for implementing a high speed synchronous protocol handshake. Further, a fifth such control line is used to select a slave for a high speed synchronous data transfer when there is a plurality of high speed synchronous slaves.

17 Claims, 9 Drawing Sheets

| Group | Name | Direction of Use (with respect to Pbus Matter 52) I/O | Number of Lines | Active Level | Description | Function |
|---|---|---|---|---|---|---|
| Data Bus 56 | PDTA [15:0] | Input & Output | 16 | --- | Transfers Pbus data signals | Data Transmission |
| | PDPL, PDPU | Input & Output | 2 | --- | Lower byte and Upper byte parity | |
| Acknowledge Lines | Acknowledge 60 | Input & Output | 1 | Low | Pbus Acknowledge For Half Word Data Transfer (16 bits) | Data Transfer Control |
| | Acknowledge 64 | Input & Output | 1 | Low | Pbus Acknowledge for Full Word Data Transfer (32 bits) | |
| Data Strobe Lines | Data Strobe 68 | Output | 1 | Low | Pbus Lower Byte Data Strobe | |
| | Data Strobe 72 | Output | 1 | Low | Pbus Upper Byte Data Strobe | |
| Read/Write Line | Read/Write 76 | Output | 1 | --- | Pbus Read/Pbus Write Designation | |
| Address Bus 80 | PADR [15:0] | Output | 16 | --- | Pbus address signals | Addressing |
| | PAPL, PAPU | Output | 2 | --- | Lower byte and Upper byte parity | |
| Address Select Lines | Address Select 88 | Output | One per device providing a synchronous or an asynchronous protocol | Low | Slave device selection signals | |
| High Speed Synchronous Lines | Request 92 | Output | 1 | Low | Message Request from Pbus Master 52 | High Speed Synchronous |
| | Direction 100 | Input | 1 | --- | Message Direction | |
| | Available 96 | Input | 1 | Low | Message Available from Slave | Message Control |
| | Ready 104 | Output | 1 | Low | Pbus Master 52 Ready for Data Transfer | |
| | Select 108 | Output | One per device providing the high speed synchronous protocol | Low | Slave Selection by Pbus Master 52 | |

TIMING DIAGRAM FOR HIGH SPEED
SYNCHRONOUS MESSAGE TRANSFER FROM THE MASTER

MASTER

REQUEST 92
FIG. 8A

SELECT 108
FIG. 8B

READY 104
FIG. 8C

SLAVE

AVAILABLE 96
FIG. 8D

DIRECTION 100
FIG. 8E

DATA BUS 56
FIG. 8F

TIMING DIAGRAM FOR HIGH SPEED
SYNCHRONOUS MESSAGE TRANSFER TO THE MASTER

MASTER

SELECT 108
FIG. 9A

READY 104
FIG. 9B

SLAVE

AVAILABLE 96
FIG. 9C

DIRECTION 100
FIG. 9D

DATA BUS 56
FIG. 9E

BUS SUPPORTING A PLURALITY OF DATA TRANSFER SIZES AND PROTOCOLS

This is a continuation of application Ser. No. 08/275,119, filed on Jul. 14, 1994 now abandoned.

FIELD OF THE INVENTION

The present invention relates to a computational system bus for transferring data between components attached to the bus wherein the bus supports a plurality of data communication protocols and a plurality of sizes of data being transferred. In particular, the novel bus supports asynchronous, synchronous and high speed synchronous protocols with each protocol able to support data transfers in a plurality of sizes.

BACKGROUND OF THE INVENTION

Components of a computational system typically communicate with one another via electrical signals conveyed by a bus. Such signals conform to a communication protocol that allows the components to exchange data in at least one predetermined format. For example, data may be exchanged between a first and second component using a synchronous data communication protocol wherein the first component places or asserts data signals on a plurality of parallel bus data transmission connections or lines, for a predetermined time interval and the second component reads the data from the bus during this predetermined time interval. Typically, a fixed amount of data is transferred between the two given components using this protocol.

Alternatively, data may be exchanged between a first and a second component using an asynchronous data communication protocol. In an asynchronous protocol, instead of data signals being asserted on the bus by the first component for a predetermined time interval, the data signals are asserted (i.e., maintained) on bus data transmission lines by the first component until an appropriate acknowledge signal is obtained from the second component acknowledging the data transfer signals were received. As with the synchronous protocol, typically a constant amount of data is also transferred with an asynchronous protocol.

In yet a third communication protocol, known as high speed synchronous, a plurality of synchronized data transfers from a first component to a second component occur without intervening data transfer control operations. That is, sets of parallelly communicated data bits (e.g., one or more bytes) are asserted on the bus data transmission lines, one set after another in rapid succession. Thus, a varying and potentially large amount of data can be transferred efficiently since bus timing cycles are not used for intervening control signals.

Many computational buses presently in use support either a synchronous, an asynchronous or a high speed synchronous protocol. Further, some buses support both a synchronous and an asynchronous protocol. However, a greater degree of flexibility is desirable such that each of the above protocols is supported on a single bus. Without the flexibility to support each of the three protocols, computational system designers are restricted in selecting system components due to component protocol incompatibilities. Such inflexibility causes designers to shun cost-effective components that do not provide a protocol supported by the bus being used. In addition, since it is not uncommon for sophisticated components to support a high speed synchronous protocol and one of either a synchronous or an asynchronous protocol, if the bus does not support all three protocols, then system designers are prevented from using the full versatility of such sophisticated components. In particular, system designers are prevented from using a component supported protocol that more appropriately satisfies a particular situation when the protocol is not supported by the bus.

To further enhance system design flexibility, it is also desirable to be able to vary the size of data transfers between components attached to the bus. For example, some components receive and/or supply only data transfers corresponding to a byte while other components receive and/or supply data transfers having sizes, for example, of two or four bytes.

It would be therefore advantageous to have a bus for a computational system having both fewer protocol restrictions and fewer data transfer size restrictions. That is, such a bus ought to be capable of supporting the three above mentioned data protocols and in addition also capable of data transfers of various sizes.

SUMMARY OF THE INVENTION

The present invention is a novel bus for a computational system wherein the bus supports synchronous, asynchronous and high speed synchronous communication protocols between components connected to the bus. Furthermore, the bus of the present invention supports one byte, two byte and four byte synchronous and asynchronous data transfers.

In providing the above features, the bus of the present invention includes a bus master component, hereinafter referred to as the master, to which all other components are in signal communication via a plurality of control connections and a separate plurality of data transmission connections or lines. Each of the non-master (i.e., slave) components communicates substantially only with the master component and further, the master component controls substantially all data transfers on the bus. Thus, the master component both provides the appropriate interface (in regards to protocol and the size of data transfers) for communication with each of the other components connected to the bus and also arbitrates component access to the bus for transferring data.

More precisely, it is an aspect of the present invention to support synchronous and asynchronous reads and writes by the master component. In addition, it is a further aspect of the present invention to support a messaging capability between the master component and each slave component capable of a high speed synchronous message data transfer (each such slave component being hereinafter denoted an HSS component). That is, unsolicited data messages of varying (and potentially large) sizes can be both sent to the master from an HSS component and sent to an HSS component from the master component.

In allowing the bus master to communicate with the other components connected to the bus, it is an aspect of the present invention to have a single data bus, which can be defined as: a single plurality of data transmission connections or lines in signal communication in common with every component such that these lines are dedicated exclusively for transferring data regardless of the data transfer characteristics of the component (e.g., the data transfer protocol(s) and the size(s) of the data transfer(s) supported). Further, to provide bus communication control, there is a judicious collection of control connections or lines whereby the control lines used for a synchronous data transfer are also used for an asynchronous data transfer. In addition, there is a separate set of control lines to control high speed synchronous communications between the master component and the HSS component(s).

More precisely, with respect to the high speed synchronous control lines, there is a single pair of control lines connecting the master commonly with all HSS components and an additional two control lines connecting the master individually with each HSS component. Moreover, if there is a plurality of HSS components, then there is a further control line between the master and each HSS component. The two control lines within the single pair of common lines provide for (a) the asserting of direction signals indicating the direction of a data transfer; and (b) the asserting of ready signals indicating when a data transfer can commence and when it should terminate. More precisely, a direction signal designates whether a high speed synchronous (HSS) message transfer is directed to or from a HSS component. The direction signals are asserted on the pair's first control line, denoted the "direction line." Each direction signal is controlled by the HSS component which has been selected by the master for the next high speed synchronous data transfer. Alternatively, the ready signals are asserted on the pair's second control line denoted the "ready line." Each ready signal is controlled exclusively by the master such that a HSS message transfer can only be performed during the assertion of the ready signal.

In regards to the three additional connections between the bus master and each individual HSS component, the first two such control lines are denoted the "request line" and the "available line." Each request line is activated exclusively by the master to assert to the HSS component to which the request line is connected that there is an HSS message to be transferred to the HSS component. Each available line is activated exclusively by the HSS component to which it connects such that this line is used to assert an available signal to the master indicating that this HSS component either has a message available for transfer to the master or can accept a message from the master. Finally, the third of the three additional connections, known as a "select line," is activated exclusively by the master to assert to an HSS component (from a plurality of HSS components) that it has been selected for the next HSS message transfer between the master and an HSS component.

Thus, as will be described in the subsequent detailed description, the HSS message transfer protocol supported by the present invention provides an effective method for efficiently transferring "bursts" of data using the same data bus as is used for synchronous and asynchronous protocols.

It is also noteworthy as a further aspect of the present invention, that if there is but a single HSS component attached to the bus, then the select line is unnecessary. Thus, there are only four control lines connecting the master to the HSS component.

Finally, in regard to varying the size of data transfers for asynchronous and synchronous data transfer protocols, it is an aspect of the present invention that acknowledge signals be communicated from asynchronous components to the master, via dedicated acknowledge control connections or lines, determining the size of an asynchronous data transfer and further that the master includes programmable features for indicating the size of each synchronous data transfer between the master and each component supporting the synchronous transfer protocol.

Further features and benefits of the present invention will become apparent from the detailed description and accompanying figures contained hereinafter.

DETAILED DESCRIPTION

Figure 1:
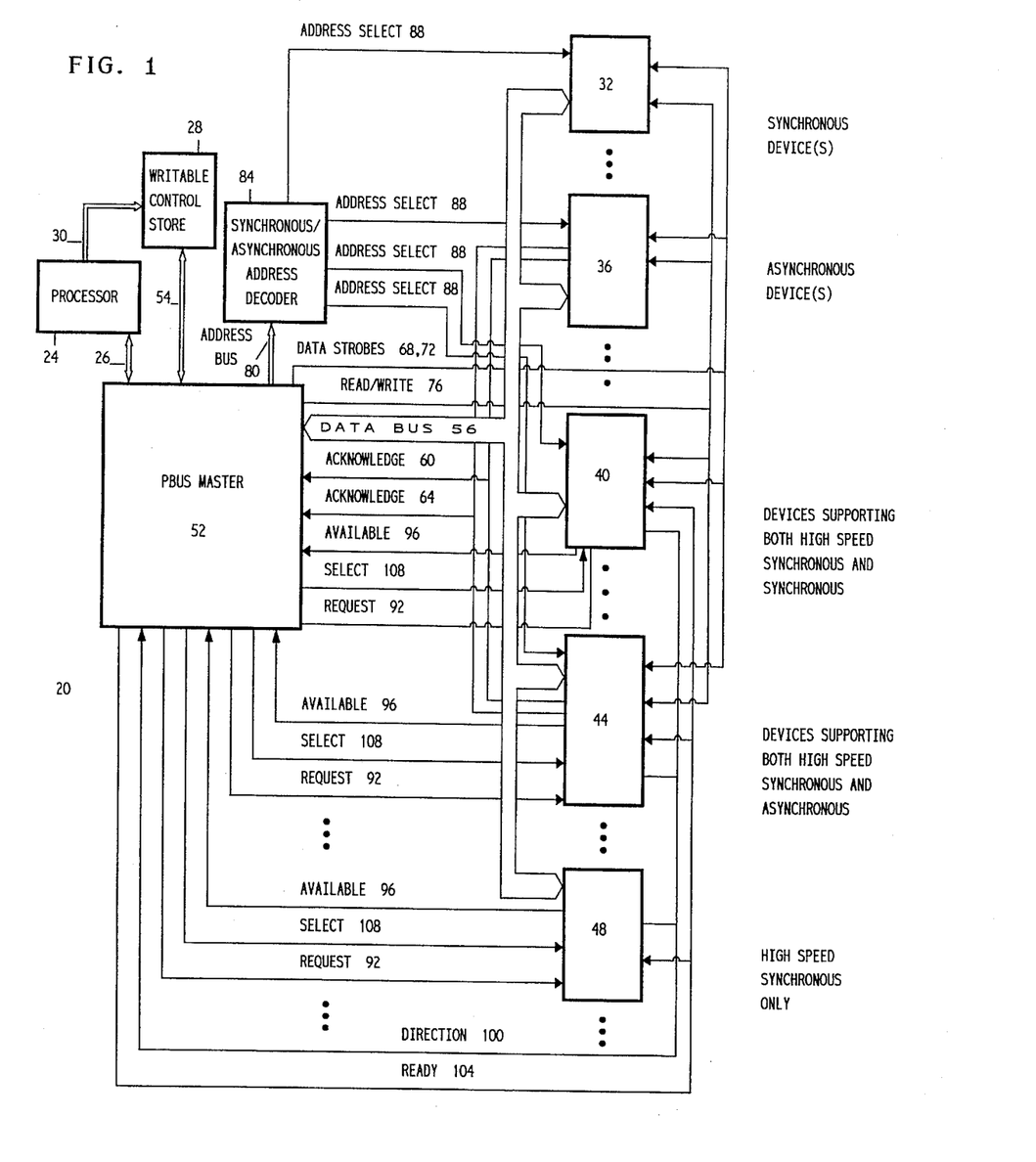
FIG. 1 is a block diagram of the data bus of the present invention, denoted the Pbus 20, wherein the Pbus is connected to various processing components such as a processor 24 and a plurality of devices 32–48 supporting various combinations of synchronous, asynchronous and high speed synchronous data transfers.

Referring to FIG. 1, a block diagram is presented of a preferred embodiment of the peripheral bus 20 (Pbus) of the present invention. The Pbus 20 is presented in a preferred embodiment where it is useful for transferring data between a processor 24 and various peripheral devices 32–48 (also denoted slaves) supporting various data transfer characteristics and protocols. The architecture of the Pbus 20 is such that there is a master component, the Pbus master 52, which both substantially controls the operation of the Pbus 20 and to which all data transfers are directed either to or from. In the present embodiment, the Pbus master 52 receives data transfer information both directly from the processor 24, via bus 26, and indirectly from the processor 24 by storing the data transfer information in the writable control store 28. Note that the data transfer information is stored in the writable control store 28 via the bus 30 and is retrieved by the Pbus master 52 via bus 54 when the Pbus master 52 is alerted to the stored data transfer information via bus 26. Further, note that data provided to the Pbus master 52 from a slave device 32–48 is, in turn, either directly provided to the processor 24 via bus 26 or, alternatively, is written to the writable control store 28 (via bus 54) and the processor 24 is alerted to the newly stored data via bus 26. Thus, the Pbus master 52 transfers data between either the processor 24 or the writable control store 28, and one or more of the peripheral devices 32–48 wherein one of the following three transfer protocols is used: asynchronous, synchronous, and high speed synchronous. Therefore, in one preferred embodiment, the Pbus 20 is used to transfer data between the processor 24 and peripheral devices used in redundant arrays of inexpensive disks (RAIDs). For example, a SCSI protocol chip serves as an example of a synchronous only communications device 32, an operator controller chip serves as an example of either a synchronous device 32 or an asynchronous device 36, depending on the protocol the chip supports, and a programmable RAID controller chip supporting one or both of an asynchronous and a high speed synchronous protocol serves as an example of one of the devices 36, 44 or 48.

Figure 2:
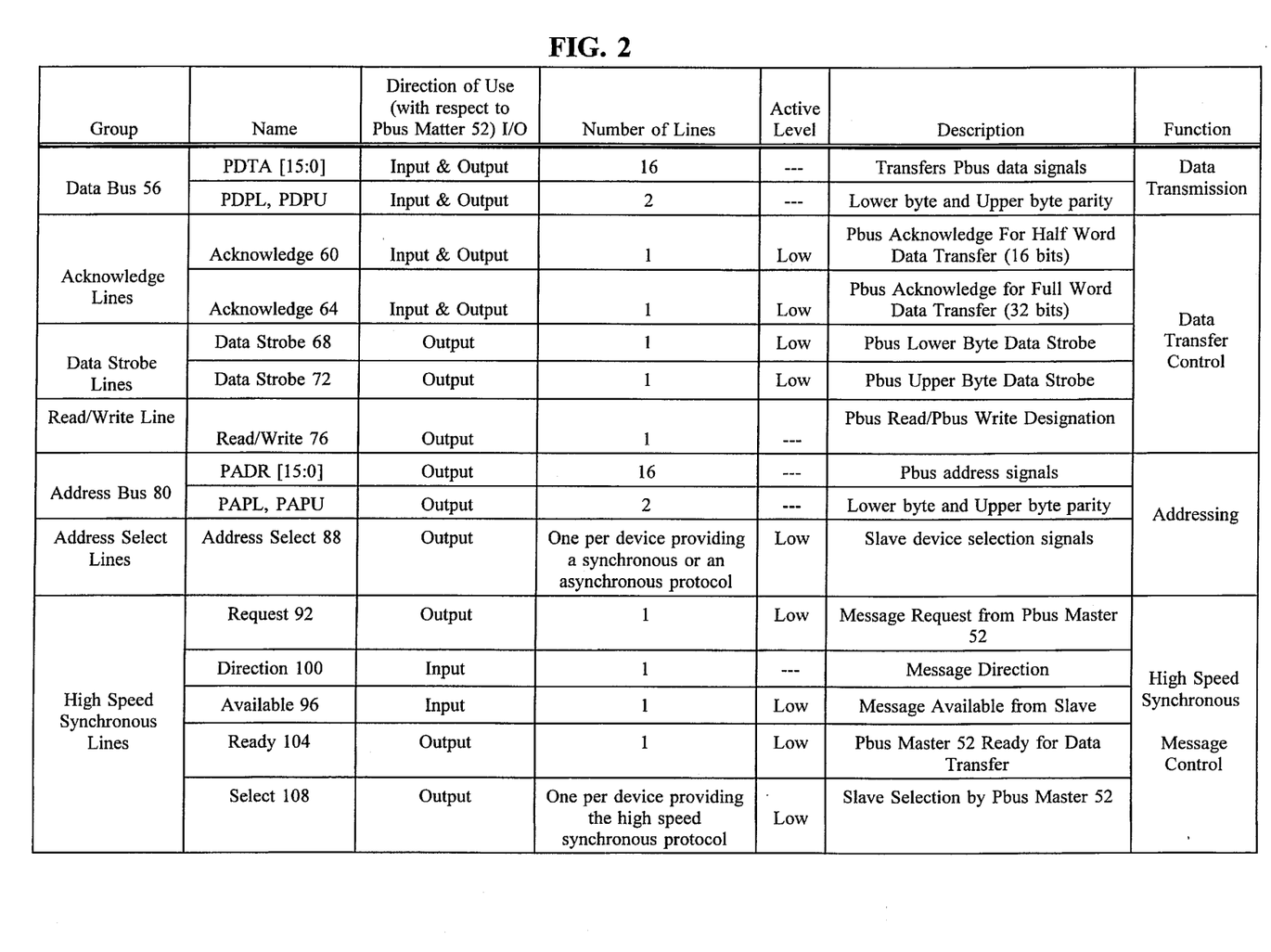
FIG. 2 is a chart describing the various signal transferring lines of the Pbus 20.

A description of the various Pbus 20 lines will now be provided with reference to FIGS. 1 and 2. A data bus 56 connects the Pbus master 52 with each of the devices 32–48 so that data signals can be transferred between the Pbus master 52 and one or more of the devices 32–48 according to a data transfer protocol supported by the device(s) involved in a data transfer. The data bus 56 includes 16 parallel data lines, denoted PDTA[0], PDTA[1], . . . , PDTA[15], each connecting the Pbus master 52 with each device 32–48 for transmission of 16 bits of data in parallel, one bit per data line. The lines PDTA are subdivided into two collections of 8 lines, PDTA[0] through PDTA[7] being the lines used for transmitting a first or lower data byte and the lines PDTA[8] through PDTA[15] used for transmitting a second or upper data byte. Further, the data bus 56 includes two parity lines: PDPL (Pbus Data Parity Lower) for the lower data byte and PDPU (Pbus Data Parity Upper) for the upper data byte.

In addition to the data bus 56, various control lines connect the Pbus master 52 with the devices 32–48. For each device supporting an asynchronous protocol, e.g., each of devices 36 and 44, there are preferably two commonly shared acknowledge lines 60 and 64 which are activated by the device exchanging data asynchronously with the Pbus master 52. (However, those skilled in the art will recognize that a single acknowledge line may also be used depending on the band width of a data transfer and the configuration of the data bus 56.) The acknowledge lines are used to signal the Pbus master 52: (a) when data is being asserted on the data bus 56 during a read by the Pbus master 52, and (b) as part of a handshake between the Pbus master 52 and an asynchronous device acknowledging that data has been asserted on the data bus 56 by the Pbus master during an asynchronous write to the asynchronous device. Note, as will be further discussed below, the acknowledge line 60 is asserted when at most a half word (16 bits) is to be transferred, and both acknowledge lines 60 and 64 are asserted when a full word (32 bits) is to be transferred. Further, note that in the present embodiment the acknowledge lines, as with most other control lines, are detected as active or asserted when there is a low voltage on the lines.

For each peripheral device supporting an asynchronous or synchronous protocol (i.e., devices 32–44), there are data strobe lines 68 and 72, shown for simplicity in FIG. 1 as a single line. The data strobe lines 68 and 72 are used to signal one or more peripheral devices that the Pbus master 52 is ready to perform a read or write of data to the data bus 56. The data strobe lines 68 and 72 determine the size of the data transfer according to the following table:

TABLE 1

| Data Strobe 72 | Data Strobe 68 | Data Bus 56 Lines Used |
| --- | --- | --- |
| inactive | active | PDTA[0]–PDTA[7] |
| active | inactive | PDTA[8]–PDTA[15] |
| active | active | PDTA[0]–PDTA[15] |

A read/write control line 76 is also provided by the Pbus to connect with each peripheral device supporting an asynchronous or synchronous protocol. The read/write line 76 is used to signal a slave or peripheral device as to whether the Pbus master 52 is requesting to perform a read to or a write from the slave. In particular, an active high signal is asserted on the read/write line 76 when a read is being requested and an active low signal is asserted on the read/write line 76 when a write is being requested. The Pbus 20 also includes addressing lines which allow the Pbus master 52 to select the slave devices 32–44 for a data transfer. Addressing lines, denoted collectively as address bus 80, connect the Pbus master 52 with a synchronous/asynchronous address decoder 84. For each asynchronous or synchronous data transfer, an address(es) of the slave device(s) involved in the data transfer is asserted on the address bus 80 and subsequently received by the synchronous/asynchronous address decoder 84. Following this, the synchronous/asynchronous address decoder 84 pairs each slave device address asserted with a corresponding address select line 88 connected to the slave(s) involved in the data transfer. Thus, when a slave address is supplied to the synchronous/asynchronous address decoder 84, this component compares the supplied address with stored device addresses for determining which slave to signal for indicating that a data transfer is being requested. As described in FIG. 2, note that the address bus 80 includes 16 parallel address lines, PADR[15:0] and 2 parity lines PAPL and PAPU.

The Pbus 20 further includes, for each slave device, at least two additional nonshared control lines used in controlling high speed synchronous data transfers between the Pbus master 52 and the slave devices 40–48 supporting the high speed synchronous protocol described hereinbelow. The two control lines are: a request line 92 and an available line 96. Further, there are two common control lines connecting all high speed synchronous devices 40–48. The two common control lines are: a direction line 100 and a ready line 104. In the Pbus 20 configuration where there is only a single high speed synchronous slave, the four control lines 96–104 suffice for controlling high speed synchronous data transfers. In this configuration, for a high speed synchronous data transfer from the Pbus master 52 to the single slave supporting the high speed synchronous protocol, the following steps are performed:

(1.1) The Pbus master 52 activates (i.e., drives low) the request line 92 indicating a high speed synchronous data transfer is requested;

(1.2) The peripheral or slave device responds by activating (i.e., driving low) the available line 96 indicating the slave's availability for the data transfer;

(1.3) The slave uses the direction line 100 to specify the direction of the data transfer since the slave itself may have an unsolicited high speed synchronous data transfer for the Pbus master 52. In particular, the slave drives and maintains the direction line 100 low to indicate the acceptability of a data transfer from the Pbus master 52 and, alternatively, drives and maintains the direction line 100 in a high voltage state to indicate a data transfer from the slave to the Pbus master;

(1.4) The Pbus master 52 responds by activating the ready line 104 and subsequently the high speed synchronous data transfer commences. Alternatively, for an unsolicited high speed synchronous transfer to the Pbus master 52, the sequence (1.2)–(1.4) of control line activations is used.

For a plurality of high speed synchronous slaves, such as devices 40–48 as illustrated in FIG. 1, an additional non-shared control line, denoted the select line 108, is connected to each such slave. The select lines 108 are used by the Pbus master 52 to select from among a number of high speed synchronous slaves which are in the process of sequencing through the above-discussed high speed synchronous initial control line protocol (1.1)–(1.4) prior to an actual data transfer. Timing diagrams for the high speed synchronous protocol, including select line 108 activation and deactivation, are presented in FIGS. 8A–8F and 9A–9E. FIGS. 8A–8F presents the timing diagram for a high speed synchronous transfer from the Pbus master 52 and FIGS. 9A–9E. presents the timing diagram for a high speed synchronous transfer from a slave to the Pbus master 52. It is worthwhile noting that if the select line 108 signals are removed from the protocol represented in FIGS. 8 and 9, then these timing diagrams represent the high speed synchronous protocol used when there is a single high speed synchronous slave.

Figure 3:
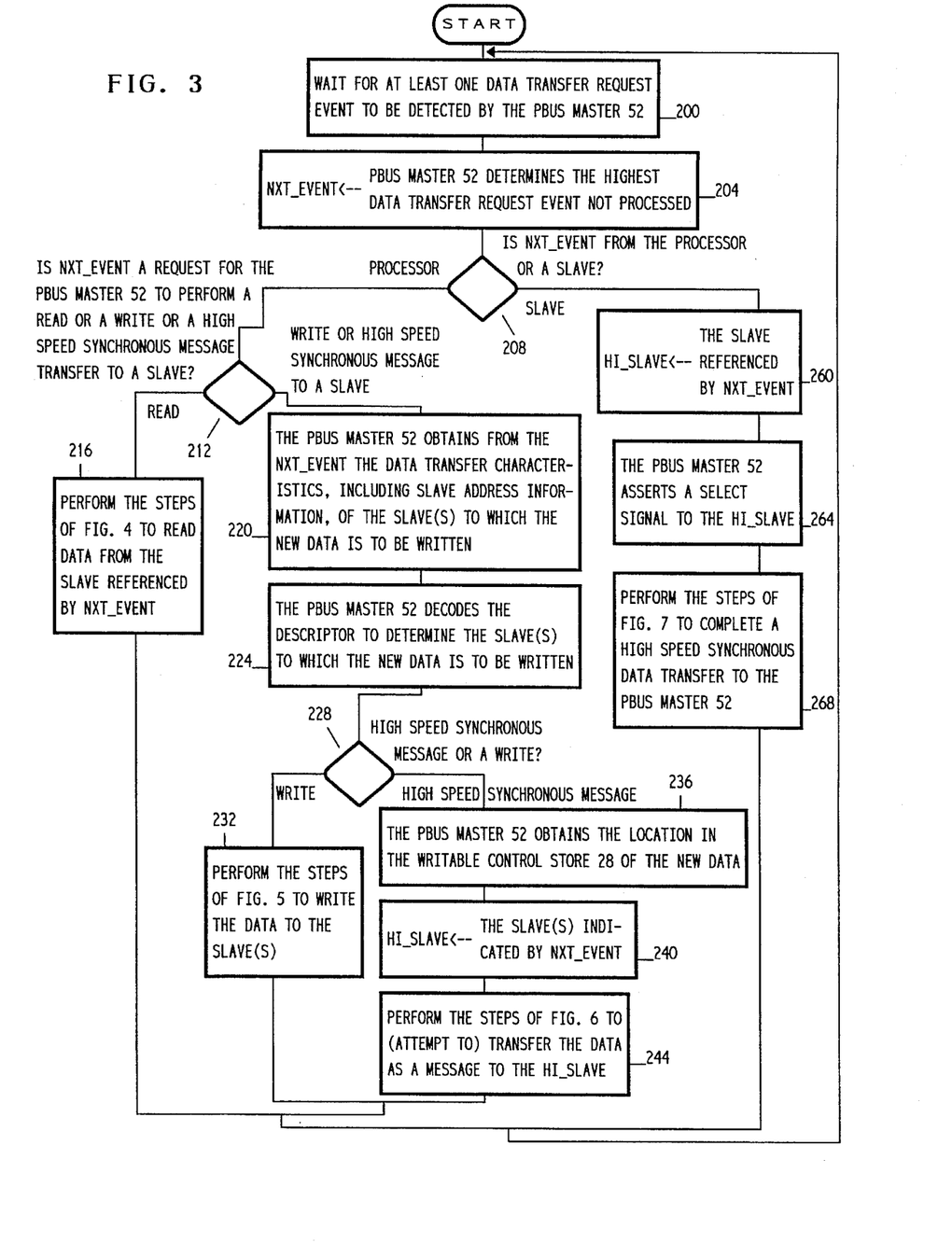
FIG. 3 is a high level flowchart of the program performed by the master bus component, the Pbus master 52, in determining the next data transfer to be performed on the Pbus 20 of the present invention.
Figure 4:
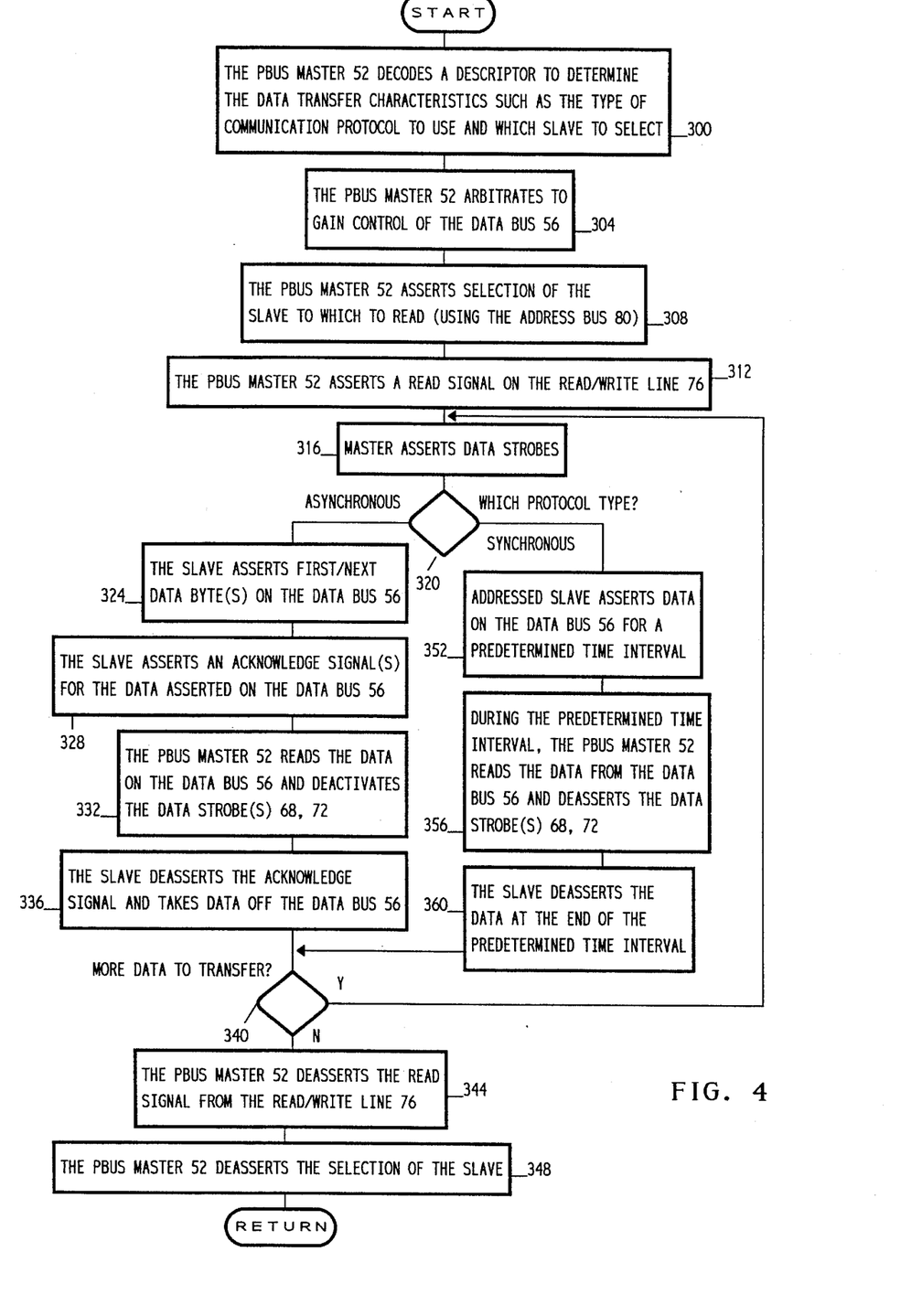
FIG. 4 is a high level flowchart of the steps taken by the Pbus master 52 and a selected slave device during a read data transfer by the Pbus master 52 using either an asynchronous or synchronous protocol.

Referring to FIG. 3, a high level flowchart of the program performed by the Pbus master 52 is presented for controlling data transfers on the Pbus 20. In step 200, the Pbus master 52 waits for a data transfer request event to be detected. Such data transfer request events can come from the processor 24 directly via the writable control store 28. In particular, the processor 24 builds high speed synchronous data transfer requests in the writable control store 28 while asynchronous and synchronous reads and writes to the slave devices 32–44 are provided directly to the Pbus master by the processor. Thus, assuming at least one data transfer request event is detected, in step 204 the request with the highest priority whose data transfer has not been processed (i.e., performed) is assigned to the variable NXT_EVENT. In step 208, a determination is made as to whether NXT_EVENT is the result of an action from the processor 24 or a high speed synchronous slave device 40–48. If NXT_EVENT is the result of processor 24, then in step 212 a determination is made as to whether the request is to perform a read, write or a high speed synchronous message transfer. If a read is to be performed, then step 216 is encountered wherein the steps of FIG. 4 are performed for reading either asynchronous or synchronous data from the slave referenced by NXT_EVENT. Subsequently, the program of FIG. 3 loops back to step 200 to process the next data transfer request event.

Alternatively, if in step 212 a write or a high speed synchronous message request is determined, then in step 220 the Pbus master 52 determines the slave address(es) from a descriptor included in NXT_EVENT. It is important to note that each such descriptor serves not only to identify the slave(s) with which a data transfer is to be performed, but also the data transfer protocol to use, the speed at which the transfer is to be performed and whether there is to be parity bits associated with the data transfer. Further, it is also important to note that the procedure for constructing the descriptors can be straightforwardly modified so that the processor 24 can construct descriptors appropriate to substantially any configuration of slave devices 32–48 wherein the slaves may have various data transfer characteristics. In addition, if a slave supports more than one data transfer protocol (i.e., devices 40 and 44), or more than one data transfer speed or transfer size, etc., then there can be a plurality of different descriptors for the same slave, each different descriptor providing distinct data transfer characteristics.

Figure 5:
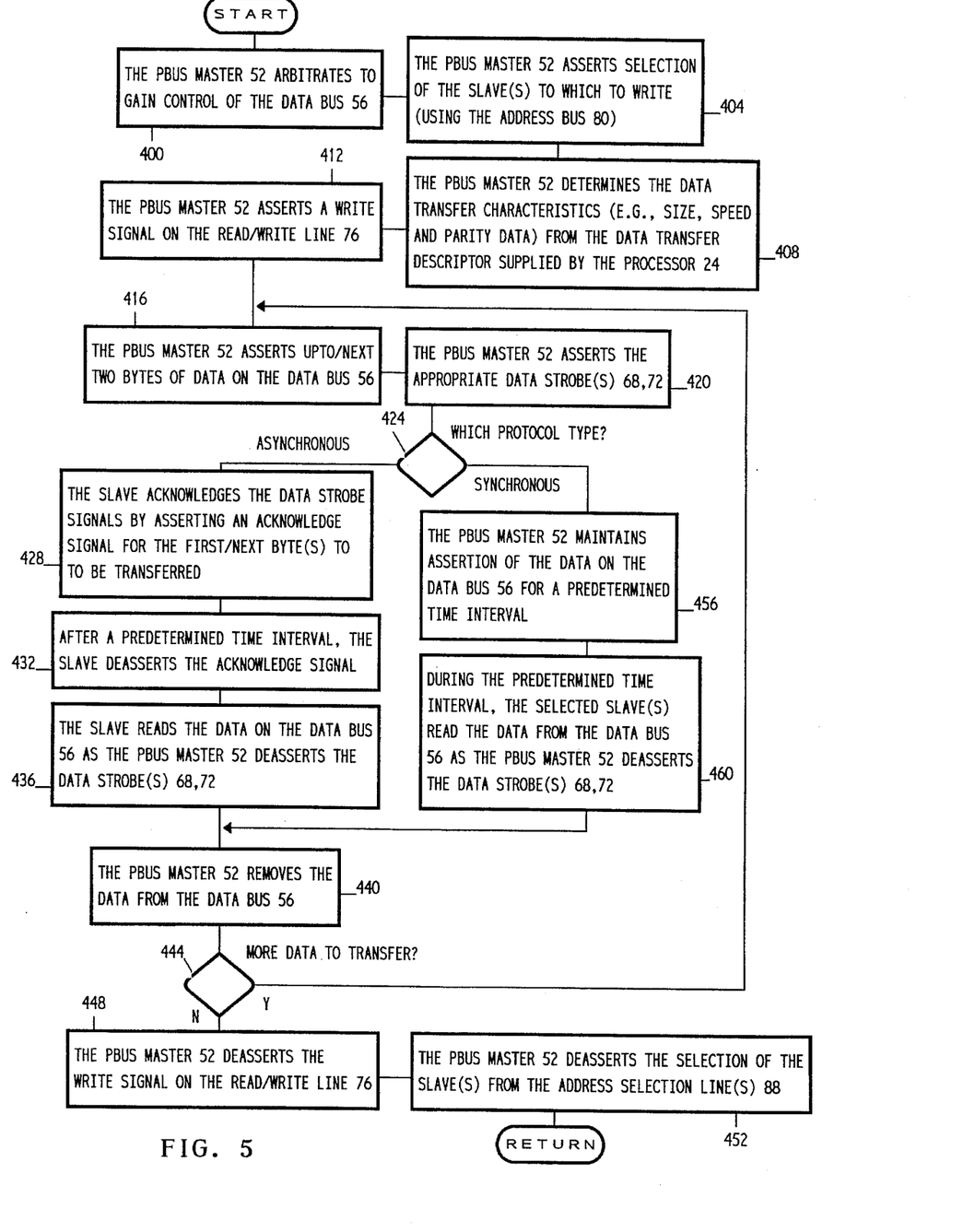
FIG. 5 is a flowchart presenting the steps performed by the Pbus master 52 and one or more selected slave components during a write operation from the Pbus master to the selected slave(s) using either an asynchronous or synchronous protocol.
Figure 6:
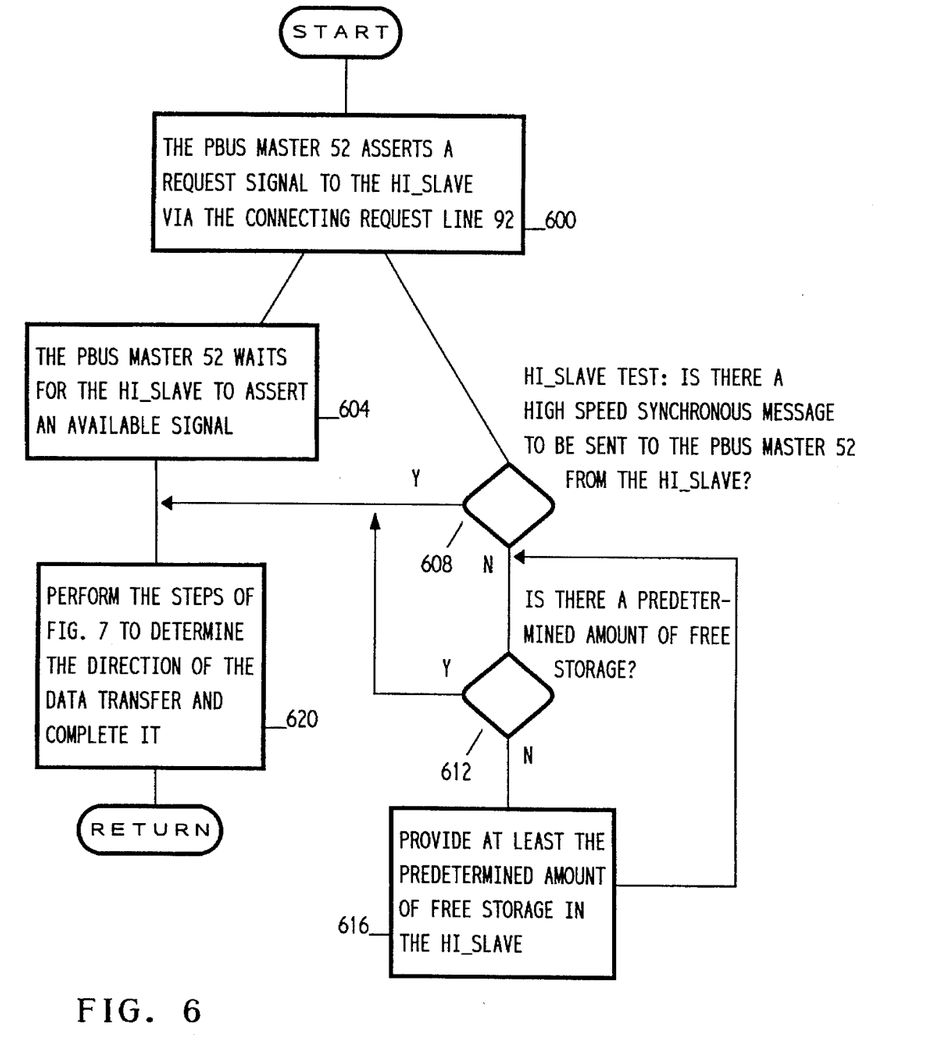
FIG. 6 is a flowchart of the steps performed by the Pbus master 52 and a selected slave component during an attempt by the Pbus master to perform a high speed synchronous data transfer to the selected slave.

Subsequently, in step 224 the Pbus master 52 decodes the descriptor(s) to determine the data transfer characteristics and the identity of the slave(s) involved in the data transfer. In step 228, a determination is made as to whether the data transfer is a write to a slave(s) or a high speed synchronous message transfer to a single slave. If a write, then in step 232 the steps of FIG. 5 are performed to write the data to the appropriate slave(s) and subsequently step 200 is again encountered. Alternatively, if in step 228 a high speed synchronous message transfer is determined, then in step 236 the Pbus master 52 obtains from the descriptor the location in the writable control store 28 of where the message to be transferred is located. Subsequently, in step 240 the slave to receive the message is denoted by the variable HI_SLAVE and in step 244 the steps of FIG. 6 are performed to transfer the data message to the slave denoted by HI_SLAVE. It should be noted that in some cases, as described with reference to FIG. 6, the data transfer in step 244 is not performed. In such cases, the corresponding data transfer event remains designated as unprocessed and therefore when steps 200 and 204 are subsequently encountered, this event will eventually be again assigned to NXT_EVENT for processing.

Figure 7:
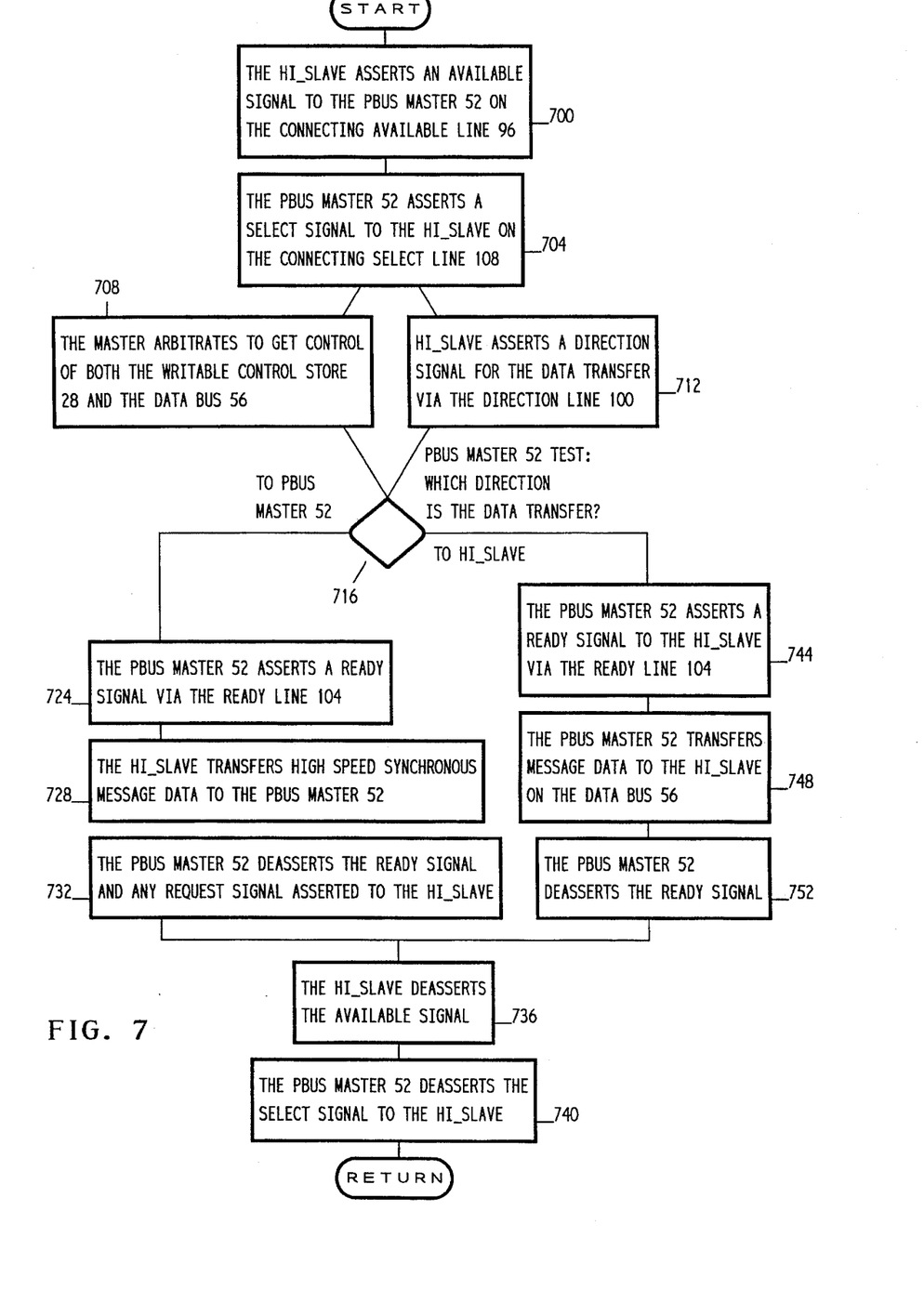
FIG. 7 is a flowchart of the steps performed by the Pbus master 52 and a selected slave component when determining the direction of a high speed synchronous data transfer and subsequently completing a high speed synchronous data transfer.
Figure 8A:
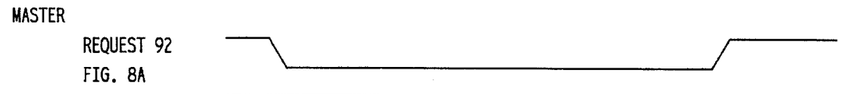
FIGS. 8A–8F are timing diagrams indicating the assertion and deassertion sequence on relevant data and control lines during a high speed synchronous data transfer from the Pbus master 52 to a selected slave, denoted SLAVE.
Figure 8B:
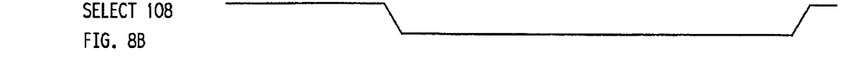
Figure 8C:
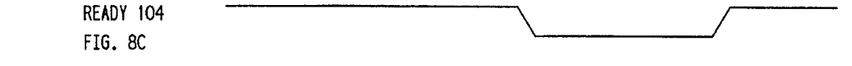
Figure 8D:
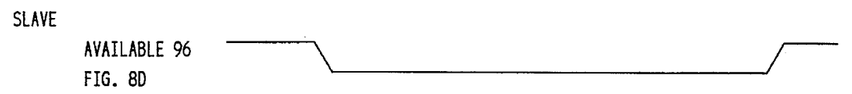
Figure 8E:
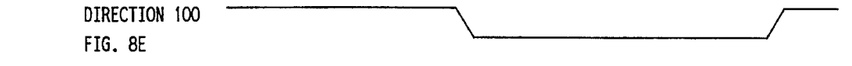
Figure 8F:
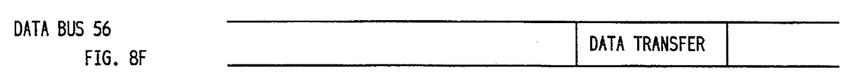
Figures 9A, 9B:
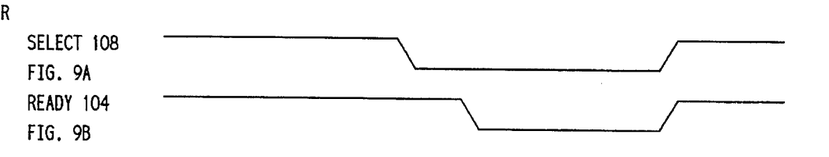
FIGS. 9A–9E are a timing diagrams indicating the assertion and deassertion sequence on relevant data and control lines during a high speed synchronous data transfer to the Pbus master 52 from a selected slave, denoted SLAVE.
Figure 9C:
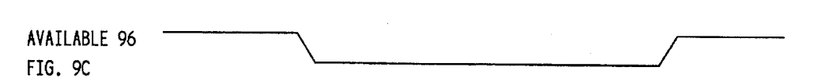
Figure 9D:
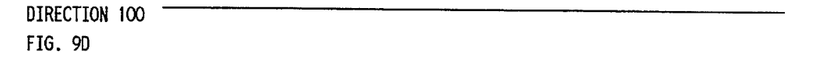
Figure 9E:
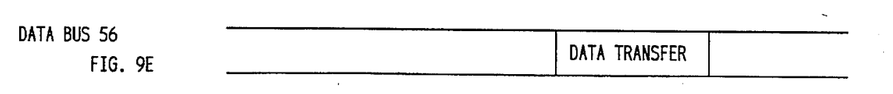

Returning now to step 208, if NXT_EVENT is determined to be from a slave, then NXT_EVENT must correspond to a high speed synchronous data transfer from the slave to the Pbus master 52, since only high speed synchronous data transfers are unsolicited by the Pbus master 52. Further, note that NXT_VENT is substantially derived from the Pbus master 52 detecting the activation of the available line 96 from the slave desiring the high speed synchronous data transfer. Subsequently, in step 260 the variable HI_SLAVE is used to denote the slave which is requesting the high speed synchronous data transfer. Thus, in step 264 the Pbus master 52 activates the select line 108 connected to HI_LAVE, signalling that this slave has been selected for a high speed synchronous data transfer. Following this in step 268, the steps of FIG. 7 are performed to complete the data transfer, thereafter allowing control to loop back to step 200.

In FIG. 4, the steps are presented for a read data transfer by the Pbus master 52. In particular, the steps performed by both the Pbus master 52 and the slave to be read are presented. Referring now to these steps, in step 300 the Pbus master 52 decodes the descriptor, obtained from NXT_EVENT (FIG. 3). The descriptor provides information indicating the slave to which the read is directed and thereby determines the data transfer characteristics to be used such as the slave's identity, the protocol (asynchronous or synchronous) to be used, the size and speed of the data transfer, and what (if any) parity signals are to be transmitted. Subsequently, in step 304 the Pbus master 52 arbitrates to gain control of the data bus 56. Following this, in step 308 the Pbus master 52 selects the slave to be read by asserting the slave's address portion of the descriptor on address bus 80. When this address is detected by the synchronous/asynchronous address decoder 84, this component determines the corresponding address select line 88 to activate thereby alerting the slave that a data transfer such as a read is requested. In step 312, the Pbus master 52 activates the common read/write line 76 to indicate that a read is requested. Subsequently, in step 316 the Pbus master 52 activates one or both data strobe lines 68 and 72. The data strobe 68 is activated, as shown in Table 1, whenever data is to be transferred via data bus lines, PDTA[0]–PDTA[7] (and potentially parity line PDPL), and data strobe line 76 is activated whenever data is to be transferred via data bus lines, PDTA[8]–PDTA[15] (and potentially parity line PDPU). Thus, one or two bytes of data may be transferred depending on the strobe lines activated. Subsequently, in step 320 the Pbus master 52 determines which protocol is to be used with the slave. Note that for each slave, the Pbus 20 supports at most only one of the asynchronous protocol and the synchronous protocol. Thus, there is no ambiguity regarding which of the asynchronous and synchronous protocols to use by either the Pbus master 52 or any slave(s) involved in a read or write data transfer.

Assuming the asynchronous protocol is to be used with the slave to be read, then in step 324 the slave asserts one or more bytes on the data bus 56 depending on the data strobe lines 68 and 72 activated. Subsequently, in step 328 one or both acknowledge lines 60 and 64 are activated to indicate whether (at most) a half word (16 bits) or a full word (32 bits) is to be transferred. That is, whenever acknowledge line 60 is activated, then there is no further data to be transferred beyond the set of at most 16 data bits currently asserted on the data bus 56. Thus, at most a half word can be transferred. Alternatively, if the acknowledge line 64 is activated, then a second set of data bits, following the first set of data bits already asserted, is to be asserted on the data bus 56. Thus, up to a full word can be transferred to the Pbus master 52 whenever acknowledge line 64 is activated. Subsequently, in step 332 the Pbus master 52 reads the data currently asserted on the data bus 56, preferably during the deactivation of the data strobe line(s) 68 and 72. That is, the data bits on the data bus 56 are clocked into the Pbus master 52 on the rising edge(s) of the data strobe signals during deactivation. Thus, in step 336 the slave, after detecting the deactivation of the data strobe(s), deasserts the acknowledge signal and takes the data off the data bus 56.

Following step 336, both the Pbus master 52 and the slave are aware of whether there is another set of data bits to be transferred due to the use of the appropriate one of the acknowledge lines 60 and 64. Thus, assuming acknowledge line 64 was asserted in step 328, then another set of data bits is to be transferred and therefore from step 340, step 316 is again encountered. Alternatively, if no further sets of data bits are to be transferred in the present read, then from step 340, step 344 is encountered wherein the Pbus master 52 deasserts the read signal on the read/write line 76. Subsequently, in step 348, the Pbus master 52 deasserts the selection of the slave and the flow of control returns to the program of FIG. 3.

Returning again to step 320 of FIG. 4, if the processor 24 supplied descriptor for the read data transfer specifies that the synchronous protocol is to be used, then step 352 is encountered wherein the slave asserts data bits on the data bus 56 for a predetermined time interval. Note that the descriptor supplies all necessary information for allowing the Pbus master 52 to coordinate the data transfer with the slave. For example, the descriptor may include the number of bytes transferred concurrently on the data bus, the total size of the data transfer, and/or the length of time the data is asserted on the data bus 56 by the slave. Alternatively, some or all of this information may reside in a predetermined location of the writable control store 28 and accessible therefrom by the Pbus master 52. Subsequently, in step 356, which occurs during the predetermined time interval that the slave asserts the data on the data bus 56, the Pbus master 52 reads the set of data bits from the data bus concurrently with the rising edge of the deassertion of the data strobe(s) 68, 72.

Following this, in step 360, the slave deasserts the data at the end of the predetermined time interval and subsequently step 340 is again encountered. Thus, if there is more data to be read, then step 316 is again encountered. Otherwise, steps 344 and 348 are performed as described above.

Referring now to FIG. 5, the steps performed by the Pbus master 52 and one or more slave(s) 32–44 during a Pbus master write are presented. In step 400 the Pbus master 52 arbitrates to gain control of the data bus 56. In step 404, the Pbus master selects the slave(s) to which a write is intended using the address bus 80, the synchronous/asynchronous address decoder 84 and the address select line(s) 88 in a manner similar to step 308 of FIG. 4. Subsequently, in step 408, the Pbus master 52 determines the data transfer characteristics from the data transfer descriptor supplied by the processor 24 via the NXT_EVENT variable of FIG. 3. In particular, the Pbus master 52 may use the descriptor to determine the size of the transfer (which in the present embodiment is 1, 2 or 4 bytes), the speed of the transfer and whether parity data is also to be transferred. Next, in step 412, the Pbus master 52 asserts a write signal (i.e., an active low signal) on the read/write line 76. Thus, the slave(s) has been selected and has been alerted that a write is being initiated. Following this, in step 416, the Pbus master 52 asserts the first set of data bits on the data bus 56, this first set of data bits having a size of either one or two bytes. In step 420, the Pbus master 52 asserts the appropriate data strobe(s) 68, 72. In particular, the data strobe lines 68 and 72 are asserted according to the data bus 56 lines activated as described in Table 1. Subsequently, in step 424, the Pbus master 52 uses the information within the data transfer descriptor from the processor 24 to determine whether the write is to be performed asynchronously or synchronously.

Assuming the write data transfer uses the asynchronous protocol and a single slave has been selected for the write, then in step 428, the slave selected asserts either the acknowledge line 60 to indicate the slave will accept up to a two byte write or acknowledge line 64 to indicate the slave will accept up to a four byte write (two bytes at a time). Subsequently, in step 432, the slave deasserts the acknowledge signal. The deassertion of the acknowledge signal is an indication to the Pbus master 52 that the data strobe(s) 68, 72 may be deasserted. Thus, in step 436, the data strobe signal(s) is deasserted and the data on the data bus 56 is clocked into the selected slave with the rising edge of the data strobe signal(s). Following this, in step 440, the Pbus master 52 removes the data from the data bus 56, and in step 444 a determination is made by the Pbus master 52 as to whether there is further data to be written to the slave. If so, then step 416 is again encountered and the second set of data bits is transferred on the data bus 56. Otherwise, if there is no further data to write, then in step 448, the Pbus master 52 deasserts the write signal on the read/write line 76 and subsequently in step 452, the Pbus master 52 deasserts the selection of the slave to which the data has been written.

Returning now to step 424, if the synchronous protocol is used for the write, then in step 456 the Pbus master 52 maintains the data on the data bus 56 for a predetermined time interval. Subsequently, in step 460 the one or more selected slaves read the data on the data bus 56 with the rising edge of the data strobe(s) on line(s) 68, 72 when the Pbus master 52 commences to deassert the data strobe signal(s). Following this, step 440 is again encountered wherein the Pbus master 52 removes the data from the data bus 56. Subsequently, in step 444 a determination is made as to whether there is more data to write. Note that for each slave supporting synchronous writes on the Pbus 20, it is known by the Pbus master 52 (possibly via communication with the processor 24 or by accessing predetermined information stored in the writable control store 28) and by the slave whether the slave can accept up to two bytes of data or up to four bytes of data. Thus, if the slave(s) are expecting a second set of data bits on the data bus 56, then the flow of control loops back to step 416 to transfer this second set of data bits. Alternatively, step 448 and 452 are performed as described above.

Referring now to FIG. 6, the steps are presented for attempting a high speed synchronous message data transfer from the Pbus master 52 to a single slave denoted the HI_SLAVE. In step 600, the Pbus master 52 asserts a request signal to the HI_SLAVE using the connecting request line 92 to indicate that a variable size high speed synchronous message is desired to be transferred to the HI_SLAVE (e.g., in one embodiment, up to 16 words). Subsequently, in step 604, the Pbus master 52 waits for the HI_SLAVE to assert an available signal on the connecting available line 96 indicating that the HI_SLAVE is available for the data transfer. In parallel with step 604, steps 608–616 are also performed. These latter steps determine: (a) whether the HI_SLAVE also has a high speed synchronous message to send to the Pbus master 52, and (b) if HI_SLAVE has no such message to transfer, then whether the HI_SLAVE has sufficient free memory to accommodate a maximal predetermined size of message which can be transferred to the HI_SLAVE. As an aside, note that the Pbus master 52 (possibly via the data transfer descriptor supplied by the processor 24 or by accessing predetermined information stored in the writable control store 28) is provided with information indicating the maximal amount of data that may be transferred via the high speed synchronous protocol to each slave supporting this protocol on the Pbus 20. Thus, whenever the HI_SLAVE also has a high speed synchronous message to transfer to the Pbus master 52 or there is sufficient memory in the HI_SLAVE to receive the message from the Pbus master, then step 620 is encountered wherein the steps of FIG. 7 are performed to determine both the direction of the high speed synchronous data transfer and subsequently to complete the data transfer.

Referring now to FIG. 7, a flowchart of the steps performed by a slave (denoted the HI_SLAVE) and the Pbus master 52 when performing a high speed synchronous data transfer. More precisely, FIG. 7 presents the steps performed: (a) when attempting to complete the high speed synchronous data transfer from the Pbus master 52 to the HI_SLAVE initiated in FIG. 6, and (b) when executing a high speed synchronous data transfer from the HI_SLAVE to the Pbus master 52. Thus, in step 700 the HI_SLAVE asserts an available signal to the Pbus master 52 using the connecting available line 96. Subsequently, in step 704, the Pbus master 52 responds with a signal on the select line 108 connecting with the HI_SLAVE. Note that there may be a number of slaves in the process of coordinating with the Pbus master 52 to commence a high speed synchronous data transfer. By selecting the HI_SLAVE, the Pbus master 52 has selected this slave for the next high speed synchronous data transfer. Or, said in another way, the selection of the slave denoted by the variable HI_SLAVE is a point of no return wherein, bearing a Pbus 20 fault, the next high speed synchronous data transfer will be with the HI_SLAVE. Subsequently, in step 708, the Pbus master 52 arbitrates to obtain control of both the writable control store 28 and the data bus 56. In parallel with step 708, step 712 is performed wherein the HI_SLAVE asserts a direction signal, via direction line 100, indicating whether the data transfer is to or from the Pbus master 52. Note that preferably high speed synchronous data transfers to the Pbus master 52 are given precedence over such transfers from the Pbus master to the HI_SLAVE. In step 716, the Pbus master 52 determines the direction of the high speed synchronous data transfer by sensing the activation level of the direction line 100. Note that the Pbus master 52 has access to predetermined information providing either a fixed or maximum amount of data that can be transferred to each slave supporting the high speed synchronous protocol on the Pbus 20. When the test of step 716 indicates a high speed data transfer to the bus master 52, then step 724 is encountered wherein the Pbus master 52 asserts a ready signal via the common ready line 104. Subsequently, once the HI_SLAVE detects the ready signal, step 728 is performed wherein the HI_SLAVE transfers data to the Pbus master 52 without intervening control signals. In the present embodiment, the data transfer can be up to 16 words sent in 32 consecutive half word sets of data bits, a half word sent every 50 nanoseconds. Next, in step 732 the Pbus master 52 deasserts the ready signal and, if the request line 92 connected to the HI_SLAVE is also active, thereby indicating that a high speed synchronous data transfer to the HI_SLAVE was requested, then this request signal is also deasserted. Following this, in step 736 the HI_SLAVE deasserts the available signal from the available line 96 to which HI_SLAVE is connected. Finally, in step 740 the Pbus master 52 deasserts the select signal on the select line 108 connected to the HI_SLAVE.

Returning again to step 716, if it is determined here that a high speed synchronous message is to be transferred to the HI_SLAVE, then in step 744 the Pbus master 52 asserts a ready signal on the common ready line 104. Subsequently, in step 748 the Pbus master 52 transfers, in half word sets of data bits, up to a predetermined maximum amount of data to the HI_SLAVE. Note that this data is transferred without intervening control signals with a half word set of data bits being transferred every 50 nanoseconds. Following the data transfer, in step 752, the Pbus master 52 deasserts the ready signal thus indicating a termination of the data transfer. Subsequently, steps 736 and 740 are performed as described above.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described hereinabove is further intended to explain the best mode presently known of practicing the invention and to enable others skilled in the art to utilize the invention as such, for other embodiments, and with the various modifications required by their particular application or uses of the invention. It is intended that the appended claims be construed to include alternative embodiments to the extent permitted by the prior art.

What is claimed is:

1. In an apparatus that includes a bus for transferring data and a number of components communicating with said bus, with said components including a master component, a first set of high speed synchronous components and a second set of one of synchronous components and asynchronous components, a method for transferring data between said components, comprising:

determining that a first high speed synchronous data transfer operation is to be conducted on said bus between said master component and a first high speed synchronous component of said first set, in which said first high speed synchronous component communicates with said master component using high speed synchronous protocol, in which said first high speed synchronous data transfer operation is conducted between said master component and said first high speed synchronous component for a first unpredetermined period of time in which a first amount of data is transferred;

starting transmitting all control signals in order to conduct said first high speed synchronous data transfer operation between said master component and said first high speed synchronous component before any data is transferred from said master component to said first high speed synchronous component during said first high speed synchronous data transfer operation, said step of starting transmitting including the steps of:

sending a request signal by said master component to said first high speed synchronous component in which said master component indicates that it desires to transfer data to said first high speed synchronous component and wherein said sending step includes changing the logic state of said request signal;

receiving an available signal by said master component from said first high speed synchronous component after the logic state of said request signal is changed and in which a change in the logic state of said available signal is indicative that said first high speed synchronous component is able to receive said data from said master component; and asserting a ready signal by said master component during said data transfer of said first high speed synchronous data transfer operation, said asserting step including a first changing of the logic state of the ready signal after said logic state of said available signal is changed and before all of said data is transferred for said first high speed synchronous data transfer operation;

transferring all data that is to be transferred during said first high speed synchronous data transfer operation to said first high speed synchronous component, after all said control signals defined in said step of starting transmitting have been initiated between said master component and said first high speed synchronous component using said high speed synchronous protocol, with all of said data being transferred in connection with said first high speed synchronous data transfer operation after said first changing of the logic state by said ready signal and before any subsequent changing of the logic state of said ready signal;

terminating said first high speed synchronous data transfer operation;

determining that a data transfer is to occur between said master component and a first component of said second set of components using one of a synchronous protocol and an asynchronous protocol for the transfer of data on said bus between said master component and said first component of said second set, with said synchronous protocol involving the transfer of data on said bus for a predetermined time interval and said asynchronous protocol involving the transfer of data on said bus by said master component until an acknowledge signal is received by said master component;

transferring data between said master component and said first component of said second set using one of said synchronous protocol and said asynchronous protocol;

ascertaining that a second high speed synchronous data transfer operation is to occur from said master component to said first high speed synchronous component in which data is to be transferred for a second unpredetermined period of time in which a second amount of data is transferred with said second unpredetermined period of time and said second amount of data being different from said first unpredetermined period of time and said first amount of data, respectively; and performing all of said same steps for said second high speed synchronous data transfer operation that were conducted for said first high speed synchronous data transfer operation including said starting transmitting, transferring and terminating steps.

2. A method, as claimed in claim 1, wherein:

said step of determining that said first high speed synchronous data transfer operation is to be conducted between said master component and said first high speed synchronous component includes selecting, by said master component, said high speed synchronous protocol.

3. A method as claimed in claim 1, further including:

at least one of sending a message to said master component and receiving a message from said master component and in which said step of sending takes precedence over said step of receiving.

4. A method as claimed in claim 1, wherein:

said master component is the only master component on said bus and all of said components of said first set and all of said components of said second set transfer data only with said master component.

5. A method as claimed in claim 1, wherein:

said step of starting transmitting includes sending a direction signal prior to said step of transferring all data from said master component, said direction signal indicating that said first high speed synchronous component receives the data transfer.

6. A method, as claimed in 1, wherein:

said step of terminating the data transfer occurs when said master component deasserts said ready signal.

7. A method as claimed in claim 1, further including:

moving data to said master component from said first high speed synchronous component of said first set.

8. A method as claimed in claim 7, wherein:

said step of moving includes sending control signals between said first high speed synchronous component and said master component that are different from and in a different sequence from said control signals transmitted during said starting transmitting step during said first high speed synchronous data transfer operation from said master component to said first high speed synchronous component.

9. A method, as claimed in claim 1, further including:

determining a size of a data transfer when said data transfer is one of a synchronous and asynchronous protocol.

10. A method, as claimed in claim 9, wherein:

said step of determining a size of a data transfer includes selecting one of: a single byte, a half word and a full word as the size of said data transfer when said data transfer is to be conducted using one of said synchronous protocol and said asynchronous protocol.

11. An apparatus for transferring data between components communicating with a bus, comprising:

a single master component;

a plurality of components communicating with said master component, said plurality of components including at least a first high speed synchronous component and one of a synchronous component and an asynchronous component and wherein all data transfers from each of said plurality of components are sent to said master component;

a bus including connection means connecting said master component and said plurality of components for transferring data between said master component and said plurality of components, said connection means including a predetermined plurality of data transmission lines such that substantially every data transfer on said bus uses said plurality of data transmission lines and said connection means has a number of control lines that provide the following:

(a) a request signal supplied by said master component to said first high speed synchronous component in which said request signal has a logic state that changes to indicate that said master component has data for transfer;

(b) an available signal supplied by said first high speed synchronous component that has a logic state that changes after said logic state of said request signal changes to indicate that said first high speed synchronous component is available to commence transfer of data; and (c) a ready signal supplied by said master component that changes its logic state after the logic state of said available signal is changed and before all data is transferred;

wherein said changes of said logic states of said request, available and ready signals occur in connection with a first high speed synchronous data transfer operation;

a plurality of protocol performing means, each protocol performing means used in a data transfer on said bus using a predetermined protocol, said plurality of protocol performing means including: a high speed synchronous protocol performing means related to a high speed synchronous protocol in which a varying amount of data can be transferred between said master component and said first high speed synchronous component during an unpredetermined period of time and at least one of: a synchronous protocol performing means related to a synchronous protocol in which data is transferred involving said master components for a predetermined time interval and an asynchronous protocol performing means related to an asynchronous protocol in which data is transferred until an acknowledged signal is received by said master component;

wherein said master component controls operations of said bus, with said master component selecting which one of said plurality of components is to be involved with a data transfer including said master component selecting said first high speed synchronous component to receive data from said master component, and wherein said first high Speed synchronous data transfer operation involves a data transfer from said master component to said first high speed synchronous component in which a first amount of data is transferred for a first unpredetermined period of time and said master component is also involved with a second high speed synchronous data transfer operation from said master component to said first high speed synchronous component in which a second amount of data is transferred for a second unpredetermined period of time, with said second unpredetermined period of time and said second amount of data being different from said first unpredetermined period of time and said first amount of data, respectively, with all of said data being transferred in connection with said first high speed synchronous data transfer operation after said first changing of the logic state by said ready signal and before any subsequent changing of the logic state of said ready signal, and wherein all of said request signal, said available signal and said ready signal change their logic states and in the same predetermined time sequence for said second high speed synchronous data transfer operation as was done for said first high speed synchronous data transfer operation.

12. An apparatus, as claimed in claim 11, further including:

a direction signal supplied by said first high speed synchronous component to indicate a direction for said data of said first high speed synchronous data transfer operation.

13. An apparatus, as claimed in claim 11, wherein:

said data transmission lines include both a number of data lines for transmitting a number of data bits transmitted, one bit per data transmission line, and one or more parity lines.

14. An apparatus, as claimed in claim 13, wherein:

said number of said data transmission lines is sixteen.

15. An apparatus, as claimed in claim 11, wherein:

said master component includes selection means for selecting said first high speed synchronous component.

16. An apparatus, as claimed in claim 15, wherein:

said selection means includes decoding means for determining said first high speed synchronous component from address data input to said selection means.

17. An apparatus, as claimed in claim 15, wherein:

said selection means includes data transfer size determination means for determining an amount of data to be transferred when said first protocol performing means is one of said synchronous protocol performing means and said asynchronous protocol performing means.

* * * * *